(12) United States Patent
Chen et al.

(10) Patent No.: US 11,876,160 B2
(45) Date of Patent: Jan. 16, 2024

(54) HEATING SYSTEM, HEATING METHOD AND APPARATUS, AND ELECTRIC DEVICE

(71) Applicant: CONTEMPORARY AMPEREX TECHNOLOGY CO., LIMITED, Ningde (CN)

(72) Inventors: Xinwei Chen, Ningde (CN); Zhimin Dan, Ningde (CN); Chengyong Liu, Ningde (CN); Wei Zhang, Ningde (CN); Yizhen Hou, Ningde (CN); Xian Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/148,126

(22) Filed: Dec. 29, 2022

(65) Prior Publication Data

US 2023/0146978 A1 May 11, 2023

Related U.S. Application Data

(63) Continuation of application No. PCT/CN2022/089535, filed on Apr. 27, 2022.

(30) Foreign Application Priority Data

Sep. 28, 2021 (CN) .......................... 202111144655.2

(51) Int. Cl.
*H01M 10/6571* (2014.01)
*H01M 10/615* (2014.01)
*H01M 10/63* (2014.01)

(52) U.S. Cl.
CPC ..... *H01M 10/6571* (2015.04); *H01M 10/615* (2015.04); *H01M 10/63* (2015.04)

(58) Field of Classification Search
CPC . H01M 10/6571; H01M 10/615; H01M 10/63
See application file for complete search history.

(56) References Cited

U.S. PATENT DOCUMENTS

| 2012/0126753 A1 | 5/2012 | Carkner |
| 2019/0115632 A1 | 4/2019 | Beuning et al. |

(Continued)

FOREIGN PATENT DOCUMENTS

| CN | 103828178 A | 5/2014 |
| CN | 206364156 U | 7/2017 |

(Continued)

OTHER PUBLICATIONS

The Royal Academy of Engineering, "The Study of Root Mean Square (RMS) Value", p. 1-3 (Year: 2021).*

(Continued)

*Primary Examiner* — Jimmy Vo
(74) *Attorney, Agent, or Firm* — ANOVA LAW GROUP, PLLC

(57) ABSTRACT

A heating system includes first and second input ends, first and second battery modules, first switch and second switches, and a control unit. The first switch is connected between first terminals of the first and second battery modules. Second terminals of the first and second battery modules are connected to each other. The second switch is connected between the first input end and the first terminal of the second battery module. The second input end is connected to the first terminal of the first battery module. The first terminals of the first and second battery modules have a same polarity, and the second terminals of the first and second battery modules have a same polarity. The control unit is connected to the first and second switches, and configured to control the first and second switches to be turned on or off.

15 Claims, 6 Drawing Sheets

(56) References Cited

U.S. PATENT DOCUMENTS

| | | | |
|---|---|---|---|
| 2019/0386352 A1 | 12/2019 | Kim et al. | |
| 2020/0207237 A1 | 7/2020 | Zuo et al. | |
| 2020/0212520 A1 | 7/2020 | Dan et al. | |
| 2021/0135308 A1* | 5/2021 | Hwang | H01M 10/44 |

FOREIGN PATENT DOCUMENTS

| | | | | |
|---|---|---|---|---|
| CN | 109256607 A | | 1/2019 | |
| CN | 110116653 A | | 8/2019 | |
| CN | 110137628 A | | 8/2019 | |
| CN | 110277607 A | | 9/2019 | |
| CN | 110336099 A | | 10/2019 | |
| CN | 110970690 A | | 4/2020 | |
| CN | 211700508 U | | 10/2020 | |
| CN | 212229493 U | | 12/2020 | |
| CN | 112224092 A | | 1/2021 | |
| CN | 212373187 U | | 1/2021 | |
| CN | 112706657 A | | 4/2021 | |
| DE | 102015012526 A1 | | 4/2016 | |
| EP | 3902078 A1 | | 10/2021 | |
| JP | 2014229522 A | | 12/2014 | |
| JP | 2020109754 A | | 7/2020 | |
| KR | 20060027062 A | | 3/2006 | |
| KR | 20140075078 A | * | 6/2014 | H01M 10/625 |
| KR | 20140075078 A | | 6/2014 | |
| KR | 20180135675 A | | 12/2018 | |
| KR | 20210053711 A | | 5/2021 | |
| KR | 20210107076 A | | 8/2021 | |
| WO | 2011092662 A1 | | 8/2011 | |
| WO | 2021089007 A1 | | 5/2021 | |
| WO | WO-2022053681 A1 | * | 3/2022 | G05D 23/20 |

OTHER PUBLICATIONS

The Korean Intellectual Property Office Written Decision on Registration for Application No. 10-2022-7027723 dated Mar. 28, 2023 6 pages (including translation).

The Korean Intellectual Property Office Request for the Submission of an Opinion for Application No. 10-2022-7027723 dated Nov. 11, 2022 18 pages (including translation).

The World Intellectual Property Organization (WIPO) International Search Report and Written Opinion for PCT/CN2022/089535 dated Jul. 6, 2022 13 pages (with translation).

The China National Intellectual Property Administration (CNIPA) The First Office Action for Chinese Application 202111144655.2 dated Sep. 25, 2023 18 Pages (With Translation).

Japan Patent Office (JPO) The Notice of Reason for rejection For JP Application No. 2022-548493 dated Sep. 26, 2023 4 Pages (Translation Included).

The European Patent Office (EPO) Extended Search Report for EP Application No. 22747234.7 Sep. 28, 2023 20 Pages.

* cited by examiner

If a heating request signal is received, control on/off states of a first switch and a second switch to heat a first battery group and a second battery group ⟋ 61

| Control the first switch to be turned off, and control, by using a control signal with a duty cycle, the second switch to be turned on and off, to heat the first battery group and the second battery group | 71 |

FIG. 7

| If a temperature of a first battery group and a temperature of a second battery group are both greater than or equal to a first temperature threshold, control a second switch to be turned off, and control a first switch to be turned on after the second switch remains off for a predetermined period of time | 81 |

FIG. 8

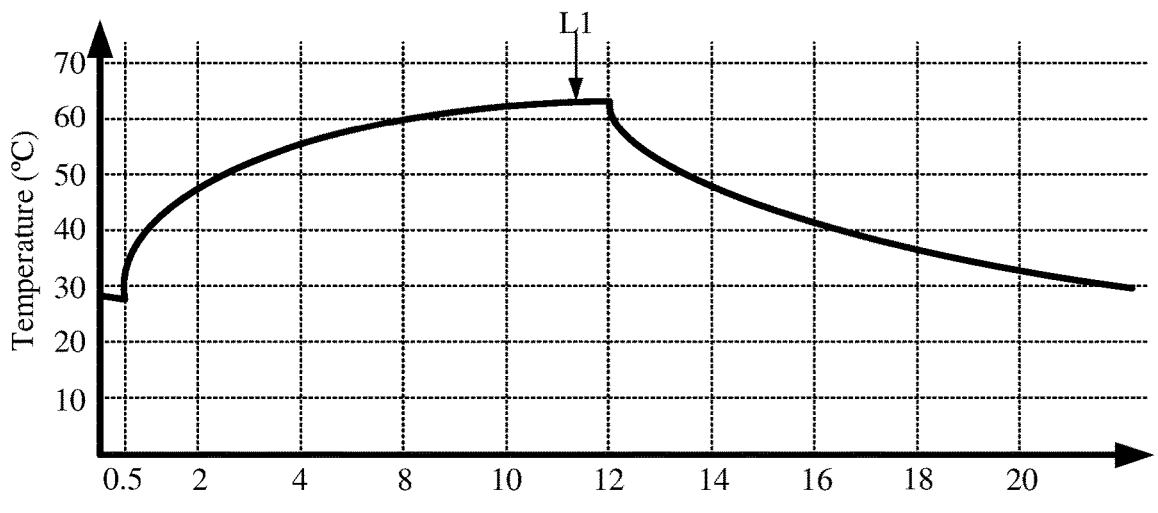

FIG. 9

HEATING SYSTEM, HEATING METHOD AND APPARATUS, AND ELECTRIC DEVICE

CROSS-REFERENCE TO RELATED APPLICATIONS

This application is a continuation of International Application No. PCT/CN2022/089535, filed on Apr. 27, 2022, which claims priority to Chinese patent application No. 202111144655.2, filed on Sep. 28, 2021 and entitled "HEATING SYSTEM, HEATING METHOD AND APPARATUS, AND ELECTRIC DEVICE", the entire contents of which are incorporated herein by reference.

TECHNICAL FIELD

This application relates to the field of battery technologies, and in particular, to a heating system, a heating method and apparatus, and an electric device.

BACKGROUND

Due to increasingly serious energy and environmental issues, China's vigorous support for new energy, and growing maturity of battery technologies, electric vehicles have become a new direction for future development of the automotive industry. The endurance mileage of the electric vehicles has become an important factor that affects popularization of the electric vehicles. As a key component, batteries are the main source of power for electric vehicles, and the stable and reliable quality of the batteries is crucial.

However, in a low-temperature environment, use of the batteries is limited. Specifically, in a low-temperature environment, discharge capacity of the batteries will severely decay, and the batteries cannot be charged. Therefore, for normal use, the batteries need to be heated in a low-temperature environment.

However, in related technologies, the batteries can typically be heated only by using a particular power source, which is not practical.

SUMMARY

This application is intended to provide a heating system, a heating method and apparatus, and an electric device, to improve practicability by lowering a requirement on a heating power source.

To achieve the foregoing objective, according to a first aspect, this application provides a heating system, where the heating system includes a first input end, a second input end, a first battery module, a second battery module, a first switch, a second switch, and a control unit, and the first input end and the second input end are configured to connect to an external input power source. The first switch is connected between a first terminal of the first battery module and a first terminal of the second battery module, a second terminal of the first battery module is connected to a second terminal of the second battery module, the second switch is connected between the first input end and the first terminal of the second battery module, and the second input end is connected to the first terminal of the first battery module. The first terminal of the first battery module and the first terminal of the second battery module have a same polarity, and the second terminal of the first battery module and the second terminal of the second battery module have a same polarity. The control unit is connected to the first switch and the second switch, and the control unit is configured to control the first switch and the second switch to be turned on or off, to heat the first battery module and the second battery module through the input power source.

The first battery module and the second battery module can be reversely connected during charging of the first battery module and the second battery module by controlling the first switch and the second switch to be turned on or off. In this case, a voltage between the two terminals of the first battery module and a voltage between the two terminals of the second battery module cancel each other out, that is, an overall voltage in the first battery module and the second battery module is 0 or close to 0. Therefore, in this case, the first battery module and the second battery module can be heated through a low-voltage power source or a power grid, meaning that a requirement for the input power source is low. Therefore, the heating system can be applied to a variety of application scenarios, which is more practical. In addition, compared with solutions using particular power sources in related technologies, this application is easier to implement and less costly. In addition, the first battery module and the second battery module can be heated at the same time, helping improve heating efficiency.

In an optional manner, the first terminal of the second battery module is connected to a first terminal of a load through a first main switch, and the second terminal of the second battery module is connected to a second terminal of the load through a second main switch. The first main switch is the second switch.

The first main switch and the second main switch are typically provided between a battery module and a load to control power gain or power loss of the load. As such, when the heating system is connected to the load, the first main switch can be used as a second switch, sparing use of the second switch, and saving costs.

In an optional manner, a voltage between the two terminals of the first battery module is equal to a voltage between the two terminals of the second battery module.

The voltage of the first battery module is set to be equal to the voltage of the second battery module, so that the voltage between the two terminals of the first battery module and the voltage between the two terminals of the second battery module cancel each other out, that is, an overall voltage in the first battery module and the second battery module is 0, after the first battery module and the second battery module are reversely connected. In this case, the first battery module and the second battery module can be heated through a low-voltage power source or power grid, lowering a requirement for the input power source. Therefore, the heating system can be applied to a variety of application scenarios, which is more practical.

In an optional manner, the first battery module and the second battery module each comprise N battery packs. The N battery packs in the first battery module are connected in parallel, and the N battery packs in the second battery module are connected in parallel.

When all battery packs are connected in parallel in the first battery module and the second battery module, the voltage of the first battery module is a voltage of one battery pack and the voltage of the second battery module is a voltage of one battery pack. As a result, when the voltages of the battery packs are set to be the same or nearly the same, the overall voltages of the first battery module and the second battery module may be 0 or close to 0 during heating of the first battery module and the second battery module, thereby lowering a requirement for the input power source and improving practicality.

In an optional manner, the control unit is specifically configured to: control the first switch to be turned off, and control, by using a control signal with a duty cycle, the second switch to be turned on or off, to heat the first battery module and the second battery module through the input power source. The control signal with a duty cycle is used to make a root mean square value of an output current of the input power source less than a root mean square value of a first current threshold.

When the first switch is turned off, and the second switch is turned on and off with a preset duty cycle, currents flow through both the first battery module and the second battery module, heat is generated and temperature rises inside the first battery module and the second battery module due to internal resistance of the first battery module and the second battery module, a heating process is thereby implemented. In addition, controlling the currents flowing through the first battery module and the second battery module to be less than the root mean square value of the first current threshold can provide protection for the first battery module and the second battery module, thereby reducing risks of possible combustion and explosion of the first battery module and the second battery module, and helping extend service life of the first battery module and the second battery module.

In an optional manner, after the first battery module and the second battery module are heated through the input power source, the control unit is further configured to: if a temperature of the first battery module and a temperature of the second battery module are both greater than or equal to a first temperature threshold, control the second switch to be turned off, and control the first switch to be turned on after the second switch remains off for a predetermined period of time.

During heating of the first battery module and the second battery module, the temperature of the first battery module and the temperature of the second battery module need to be detected in real time. Heating is completed when the temperature of the first battery module and the temperature of the second battery module reach the first temperature threshold. In this case, the second switch should be controlled to be turned off to disconnect from the input power source. Within the predetermined period of time in which the second switch remains off, a voltage difference between the first battery module and the second battery module is reduced to be less than a first voltage difference threshold. The first switch is controlled to be turned on after the predetermined period of time within which the second switch remains off. In this way, a possible loop current can be reduced to protect electrical components in the heating system, helping improve operation stability of the heating system.

According to a second aspect, this application provides a heating method, applied to a heating system, where the heating system includes a first battery module, a second battery module, a first switch, a second switch, a first input end, and a second input end, where the first input end and the second input end are configured to connect to an external input power source. The first switch is connected between a first terminal of the first battery module and a first terminal of the second battery module, a second terminal of the first battery module is connected to a second terminal of the second battery module, the second switch is connected between the first input end and the first terminal of the second battery module, and the second input end is connected to the first terminal of the first battery module. The first terminal of the first battery module and the first terminal of the second battery module have a same polarity, and the second terminal of the first battery module and the second terminal of the second battery module have a same polarity. The method includes: if a heating request signal is received, controlling switch states of the first switch and the second switch to heat the first battery module and the second battery module, where the switch state includes on or off.

Heating is performed only after a heating request signal is received, which can reduce a probability of accidental heating and help to protect the first battery module and the second battery module to extend service life of the first battery module and the second battery module. Then, switch states of the first switch and the second switch are controlled so that the first battery module and the second battery module can be reversely connected during charging of the first battery module and the second battery module. In this case, the first battery module and the second battery module can be heated through a low-voltage power source or a power grid, so that the heating system can be applied to a variety of application scenarios, which is more practical. In addition, compared with solutions using particular power sources in related technologies, this application is easier to implement and less costly. In addition, the first battery module and the second battery module can be heated at the same time, helping improve heating efficiency.

In an optional manner, the controlling switch states of the first switch and the second switch to heat the first battery module and the second battery module includes: controlling the first switch to be turned off, and controlling, by using a control signal with a duty cycle, the second switch to be turned on or off, to heat the first battery module and the second battery module. The control signal with a duty cycle is used to make a root mean square value of an output current of the input power source less than a root mean square value of a first current threshold.

When the first switch is turned off, and the second switch is turned on and off at the duty cycle, currents flow through both the first battery module and the second battery module, and heat is generated and temperature rises inside the first battery module and the second battery module due to internal resistance of the first battery module and the second battery module, the heating process is thereby implemented. In addition, the first battery module and the second battery module can be protected by controlling root mean square values of the currents flowing through the first battery module and the second battery module to be less than a root mean square value of a first current threshold, thereby reducing risks of combustion and explosion of the first battery module and the second battery module, and helping extend service life of the first battery module and the second battery module.

In an optional manner, after the first battery module and the second battery module are heated, the method further includes: if a temperature of the first battery module and a temperature of the second battery module are both greater than or equal to a first temperature threshold, controlling the second switch to be turned off, and controlling the first switch to be turned on after the second switch remains off for a predetermined period of time.

During heating of the first battery module and the second battery module, the temperature of the first battery module and the temperature of the second battery module need to be detected in real time. Heating is completed when the temperature of the first battery module and the temperature of the second battery module reach the first temperature threshold. In this case, the second switch should be controlled to be turned off to disconnect from the input power source. Within the predetermined period of time in which the second switch remains off, a voltage difference between the first battery module and the second battery module is reduced to be less than a first voltage difference threshold. The first switch is controlled to be turned on after the second switch remains off for the predetermined period of time. In this way, a possible loop current can be reduced to protect electrical components in the heating system, helping improve operation stability of the heating system.

According to a third aspect, this application provides an electric device, including the foregoing heating system.

In an optional manner, the electric device is an electric vehicle.

Beneficial effects of the embodiments of this application are as follows: In the heating system provided in this application, the first switch is disposed between the first terminal of the first battery module and the first terminal of the second battery module, and the second switch is disposed between the first input end and the first terminal of the second battery module. The first switch and the second switch are controlled to be turned on or off, so that the first battery module and the second battery module can be reversely connected during charging of the first battery module and the second battery module. In this case, the voltage between the two terminals of the first battery module and the voltage between the two terminals of the second battery module cancel each other out, and the heating process can be implemented for the first battery module and the second battery module through a low-voltage power source or a power grid, allowing the heating system to be applied to a variety of application scenarios, which is more practical. In addition, compared with solutions using particular power sources in related technologies, this application is easier to implement and less costly. Moreover, the first switch and the second switch can be heated at the same time, helping improve heating efficiency.

BRIEF DESCRIPTION OF DRAWINGS

A person of ordinary skill in the art can clearly understand various other advantages and benefits by reading the detailed description of some embodiments below. The accompanying drawings are merely intended to illustrate some implementations and are not intended to limit this application. In addition, in all the accompanying drawings, same parts are indicated by same accompanying symbols. In the accompanying drawings:

FIG. 7 is a schematic diagram of an implementation of step 61 illustrated in FIG. 6 disclosed in an embodiment of this application;

FIG. 8 is a flowchart of method steps performed after a first battery module and a second battery module are heated as disclosed in an embodiment of this application;

FIG. 9 is a schematic structural diagram of a heating curve disclosed in an embodiment of this application;

Figure 1:
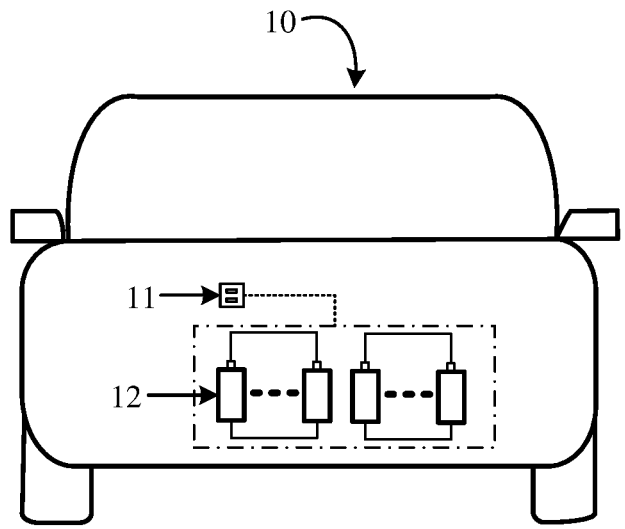
FIG. 1 is a schematic structural diagram of a vehicle disclosed in an embodiment of this application.

In the accompanying drawings, the figures are not drawn to scale.

DESCRIPTION OF EMBODIMENTS

The following describes in detail the embodiments of technical solutions in this application with reference to the accompanying drawings. The following embodiments are merely used to describe technical solutions in this application more explicitly, and therefore they are merely used as examples and do not constitute a limitation to the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims, and the foregoing brief description of drawings of this application are intended to cover a non-exclusive inclusion.

In descriptions of the embodiments of this application, the terms "first" and "second" and the like are merely intended to distinguish between different objects, and shall not be understood as an indication or implication of relative importance or implicit indication of the number, specific sequence, or dominant-subordinate relationship of indicated technical features. In the descriptions of this application, "a plurality of" means at least two unless otherwise specifically stated.

The term "embodiment" described herein means that specific features, structures, or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may combine with another embodiments.

In the descriptions of the embodiments of this application, the term "and/or" in this application describes only an association relationship for describing associated objects and represents those three relationships may exist. For example, A and/or B may represent the following three cases: A alone, both A and B, and B alone. In addition, a character "/" in this specification generally indicates an "or" relationship between contextually associated objects.

In the descriptions of the embodiments of this application, term "a plurality of" means two (inclusive) or more. Similarly, "a plurality of groups" means two (inclusive) or more groups, and "a plurality of pieces" means two (inclusive) or more pieces.

In the descriptions of the embodiments of this application, the orientations or positional relationships indicated by the technical terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of the embodiments of this application and simplify the descriptions, are not intended to indicate or imply that the apparatuses or components mentioned in this application must have specific orientations, or be constructed and operated for a specific orientation, and therefore shall not be construed as a limitation to embodiments of this application.

In the descriptions of the embodiments of this application, unless otherwise specified and defined explicitly, the technical terms "installment", "link", "connection", and "fix" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components or an interactive relationship between two components. Persons of ordinary skill in the art can understand specific meanings of these terms in this application based on specific situations.

In recent years, the new energy vehicle industry has seen explosive growth. Batteries are the core of electric vehicles and also a comprehensive representation of automotive engineering and electrical engineering technologies.

Due to the electrochemical characteristics of electrical vehicle batteries, charging and discharging capacity of the electrical vehicle batteries is greatly limited in low-temperature environments, which severely affects user experience of vehicles in winter. Therefore, for normal use, the electrical vehicle batteries need to be heated in the low-temperature environments.

During implementation of this application, the inventors of this application have found that: at present, a common heating scheme is to use an external high-voltage power source to make a battery rapidly switch between charging and discharging, and after a heating current flows through the battery, heat is generated and temperature rises inside the battery due to internal resistance of the battery, thereby implementing a heating process.

However, because a voltage is also present between two ends of the battery, a high-voltage power source with quite high voltage is required to charge the battery. In other words, a particular power source is needed to complete the heating process of the battery. In other words, such scheme applies only to specific application scenarios, which is not practical.

Based on this, the inventors designed a heating system that is able to heat the battery based on a lowered requirement for heating power source, for example, by using a low-voltage power source or a power grid as a heating power source. Therefore, the heating system can be applied to a variety of application scenarios, which is more practical.

The battery in the embodiments of this application may be a solid-state battery, a lithium-ion battery, a lithium metal battery, a lead-acid battery, a nickel-cadmium battery, a nickel-metal hydride battery, a lithium-sulfur battery, a lithium-air battery, a sodium-ion battery, or the like. This is not limited herein. In terms of scale, the battery in this embodiment of this application may be a battery cell, or may be a battery module or a battery pack. This is not limited herein. In terms of application scenarios, the battery can be used in power apparatuses such as an automobile and a ship. For example, the battery can be used in an electric vehicle to power a motor of the electric vehicle as a power source for the electric vehicle. The battery can also power other electric components in the electric vehicle, such as powering an in-car air conditioner, an in-car player, or the like.

An embodiment of this application provides an electric device including the heating system in the embodiments of this application. The electric device may include but is not limited to a mobile phone, a tablet, a laptop, an electric toy, an electric tool, an electric scooter, an electric vehicle, a ship, a spacecraft, or the like. The electric toy may include a fixed or mobile electric toy, such as a game console, an electric vehicle toy, an electric ship toy, and an electric airplane toy. The spacecraft may include an airplane, a rocket, a space shuttle, a spaceship, or the like.

For ease of description, the electric device being a vehicle 10 in an embodiment of this application is used as an example to describe the following embodiments.

Referring to FIG. 1, FIG. 1 is a schematic structural diagram of a vehicle according to some embodiments of this application. The vehicle may be an oil-fueled vehicle, a gas-powered vehicle, or a new energy vehicle. The new energy vehicle may be a battery electric vehicle, a hybrid electric vehicle, an extended-range electric vehicle, or the like. A socket 11 and a heating system according to any one of the embodiments of this application are provided inside the vehicle. The socket 11 is used to connect an input power source, where the input power source may be a low-voltage power source or a power grid, or the like. Input power source is transmitted to the heating system to heat a battery pack 12 in the heating system through the input power source.

The heating system includes 2K battery packs 12, where K battery packs 12 in the 2K battery packs 12 are connected in parallel and the rest K battery packs 12 are connected in parallel, with K being a positive integer. The battery pack 12 can be provided at the bottom, head, or tail of the vehicle. The battery pack 12 includes at least one battery cell, where the battery cell is configured for charging or discharging, and can be recharged repeatedly in a recyclable manner. The battery pack 12 may be configured to power the vehicle 10. For example, the battery pack 12 may be used as an operational power source for the vehicle 10.

In some embodiments of this application, the battery pack 12 can be used as not only the operational power source for the vehicle 10 but also a driving power source for the vehicle 10, replacing all or part of the fossil fuel or the natural gas to provide driving power for the vehicle 10.

This application does not limit application scenarios of the heating system, and the heating system in this embodiment of this application can implement heating of the battery pack 12 when needed.

Figure 2:
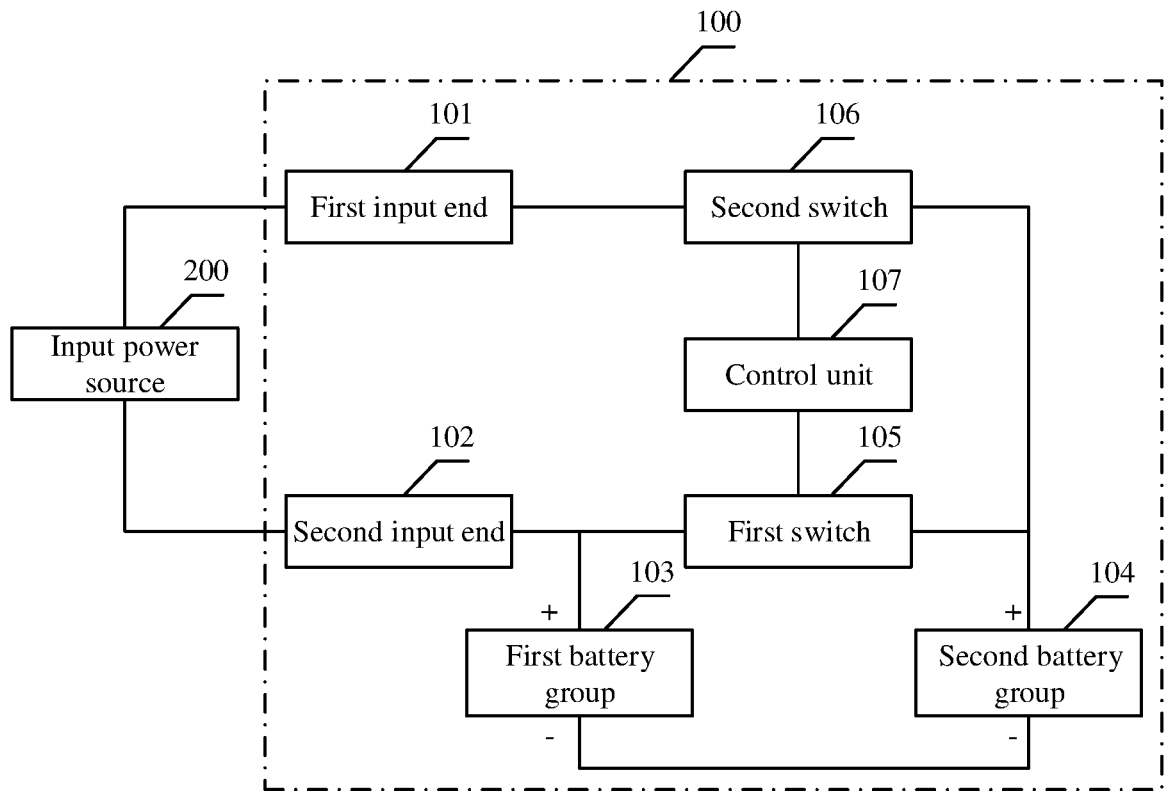
FIG. 2 is a schematic structural diagram of a heating system disclosed in an embodiment of this application.

As shown in FIG. 2, a heating system 100 in this embodiment of this application includes a first input end 101, a second input end 102, a first battery module 103, a second battery module 104, a first switch 105, a second switch 106, and a control unit 107. The first input end 101 and the second input end 102 are configured to connect to an external input power source 200. The first switch 105 is connected between a first terminal of the first battery module 103 and a first terminal of the second battery module 104, a second terminal of the first battery module 103 is connected to a second terminal of the second battery module 104, the second switch 106 is connected between the first input end 101 and the first terminal of the second battery module 104, the second input end 102 is connected to the first terminal of the first battery module 103, and the control unit 107 is connected to the first switch 105 and the second switch 106. The first battery module 103 and the second battery module 104 each include at least one battery cell.

The first terminal of the first battery module 103 and the first terminal of the second battery module 104 have a same polarity, and the second terminal of the first battery module 103 and the second terminal of the second battery module 104 have a same polarity. Specifically, if the first terminal of the first battery module 103 is a positive electrode and the second terminal of the first battery module 103 is a negative electrode, the first terminal of the second battery module 104 is a positive electrode and the second terminal of the second battery module 104 is a negative electrode. On the contrary, if the first terminal of the first battery module 103 is a negative electrode and the second terminal of the first battery module 103 is a positive electrode, the first terminal of the second battery module 104 is a negative electrode and the second terminal of the second battery module 104 is a positive electrode.

Figure 3:
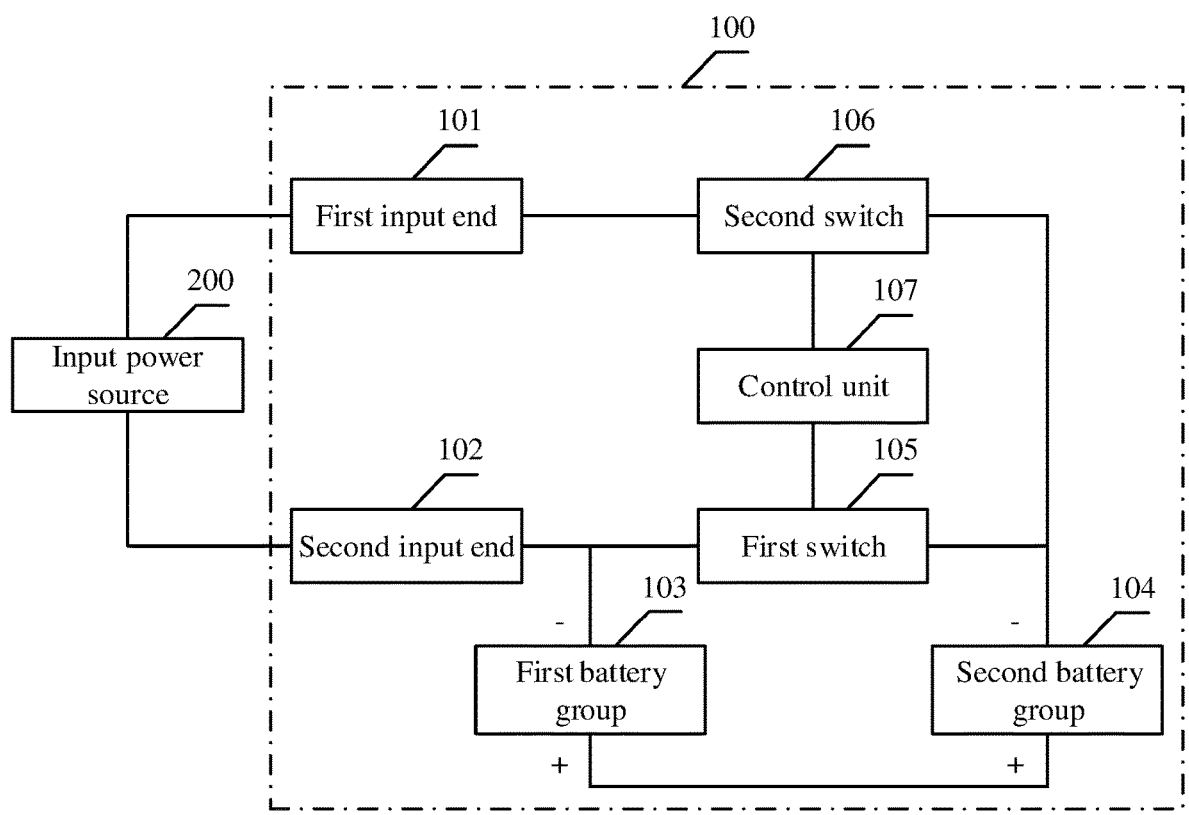
FIG. 3 is a schematic structural diagram of a heating system disclosed in another embodiment of this application.

Referring to FIG. 2 and FIG. 3, "+" indicates a positive electrode and "−" indicates a negative electrode. In FIG. 2, for example, the first terminal of the first battery module 103 is a positive electrode, the second terminal of the first battery module 103 is a negative electrode, the first terminal of the second battery module 104 is a positive electrode, and the second terminal of the second battery module 104 is a negative electrode. In FIG. 3, for example, the first terminal of the first battery module 103 is a negative electrode, the second terminal of the first battery module 103 is a positive electrode, the first terminal of the second battery module 104 is a negative electrode, and the second terminal of the second battery module 104 is a positive electrode.

The heating system shown in FIG. 2 is used an example for the following description. The working principle of the heating system shown in FIG. 3 is the same as that of the heating system shown in FIG. 2, and details are not repeated herein.

In FIG. 2, the first switch 105 and the second switch 106 are both controlled by the control unit 107, that is, the control unit 107 can output a control signal to control the first switch 105 to be turned on or off, and to control the second switch 106 to be turned on or off, so as to heat the first battery module 103 and the second battery module 104 through the input power source 200.

Specifically, when the first switch 105 is turned off and the second switch 106 is closed, the input power source 200, the first input end 101, the second switch 106, the second battery module 104, the first battery module 103, and the second input end 102 form a loop. The input power source 200 outputs a current, and the current flows through the first battery module 103 and the second battery module 104. Because of internal resistance of the first battery module 103 and the second battery module 104, the first battery module 103 and the second battery module 104 are being heated due to heat generated by the current flowing through the first battery module 103 and the second battery module 104.

Then, when the first switch 105 is turned on and the second switch 106 is turned off, the loop between the input power source 200, the first battery module 103, and the second battery module 104 is disconnected, the current on the first battery module 103 and the second battery module 104 is reduced to 0, and the process of heating the first battery module 103 and the second battery module 104 through the input power source 200 ends. In this case, the heating of the first battery module 103 and the second battery module 104 is completed, and the first battery module 103 and the second battery module 104 can be used as a power source to power a load.

In this embodiment, during heating of the first battery module 103 and second battery module 104, the first battery module 103 and the second battery module 104 are reversely connected, so that the voltage between the two terminals of the first battery module 103 and the voltage between the two terminals of the second battery module 104 cancel each other out. In other words, the overall voltage of the first battery module 103 and the second battery module 104 is 0 or close to 0. In this case, the first battery module 103 and the second battery module 104 as a whole can be equated as a resistor. In this way, the first battery module 103 and the second battery module 104 can be heated through a low-voltage power source or power grid, instead of using a particular power source as in the related art. This shows that the heating system 100 has a lower requirement for the input power source 200. Therefore, the heating system 100 can be applied to a variety of application scenarios, which is more practical. In addition, implementation difficulty and costs are also reduced. In addition, the first battery module 103 and the second battery module 104 can be heated at the same time, helping improve heating efficiency.

In an embodiment, a voltage between the two terminals of the first battery module 103 is equal to a voltage between the two terminals of the second battery module 104.

The voltage of the first battery module 103 is set to be equal to the voltage of the second battery module 104, so that the voltage between the two terminals of the first battery module 103 and the voltage between the two terminals of the second battery module 104 cancel each other out, that is, an overall voltage in the first battery module 103 and the second battery module 104 is 0, after the first battery module 103 and the second battery module 104 are reversely connected. In this case, the first battery module 103 and the second battery module 104 can be heated through a low-voltage power source or power grid, lowering a requirement for the input power source. Therefore, the heating system can be applied to a variety of application scenarios, which is more practical.

It should be noted that each switch (such as the first switch 105 and the second switch 106) in this embodiment of this application can be any electronic component that can serves as a switch, such as a metal-oxide-semiconductor field-effect transistor MOSFET, an insulated gate bipolar transistor IGBT, a silicon controlled rectifier SCR, a gate turn-off thyristor GTO, a giant transistor GTR, or any commonly used switch, such as a contactor, a relay, a time-delay switch, a photoelectric switch, a tact switch, a proximity switch, or a variety of combinations of the foregoing switches.

Figure 4:
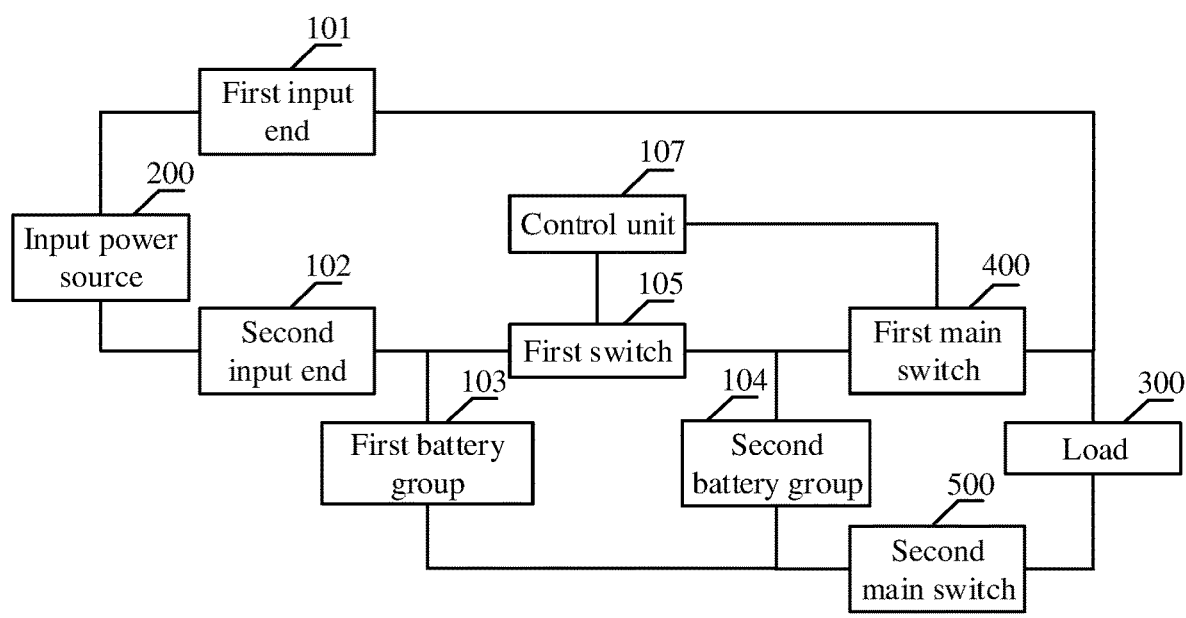
FIG. 4 is a schematic structural diagram of a heating system disclosed in still another embodiment of this application.

In an embodiment, as shown in FIG. 4, the first terminal of the second battery module 104 is connected to a first terminal of a load 300 through a first main switch 400, and the second terminal of the second battery module 104 is connected to a second terminal of the load 300 through a second main switch 500. In this embodiment, the first main switch 400 can be used as the second switch 106 shown in FIG. 2 or FIG. 3, that is, the first main switch 400 can serve as a second switch 106. It can be learned from the foregoing embodiments that the second switch 106 is connected between the first input end 101 and the first terminal of the second battery module 104, and the first main switch 400 should also be connected between the first input end 101 and the first terminal of the second battery module 104.

It should be understood that in this embodiment, if the first terminal of the first battery module 103 and the first terminal of the second battery module 104 are both positive electrodes, and the second terminal of the first battery module 103 and the second terminal of the second battery module 104 are both negative electrodes, the first main switch 400 should be connected to a positive electrode of the load. If the first terminal of the first battery module 103 and the first terminal of the second battery module 104 are both negative electrodes, and the second terminal of the first battery module 103 and the second terminal of the second battery module 104 are both positive electrodes, the first main switch 400 should be connected to a negative electrode of the load.

When the heating system 100 is connected to the load 300, a first main switch 400 and a second main switch 500 are typically provided between the heating system 100 and the load 300 to control power gain or power loss of the load 300. Then, the first main switch 400 can be used as a second switch 106 in the foregoing embodiment to spare use of the second switch 106, thereby reducing costs of the heating system 100.

In an embodiment, the heating system 100 can be applied to a new energy vehicle. A battery (corresponding to the first battery module 103 and the second battery module 104 in the foregoing embodiments) is provided in the new energy vehicle, a main positive switch is provided between the positive electrode of the battery and the positive electrode of the load, and a main negative switch is provided between the negative electrode of the battery and the negative electrode of the load. In this embodiment, the main positive switch may correspond to the first main switch 400 in the foregoing embodiment, and the main negative switch corresponds to the second main switch 500 in the foregoing embodiment. Alternatively, the main negative switch may correspond to the first main switch 400 in the foregoing embodiment, and the main positive switch corresponds to the second main switch 500 in the foregoing embodiment. In this way, the main positive switch or main negative switch that comes with the new energy vehicle can be used as the second switch 106 to reduce costs.

It should be noted that the hardware structure of the heating system 100 shown in FIG. 2, FIG. 3, or FIG. 4 is only an example, and the heating system 100 may have more or fewer components than those shown in the figures, may combine two or more components, or may have different component configurations, and the various components shown in the figures may be implemented in hardware, software, or a combination of hardware and software including one or more signal processing and/or application-specific integrated circuits.

Figures 5, 6:
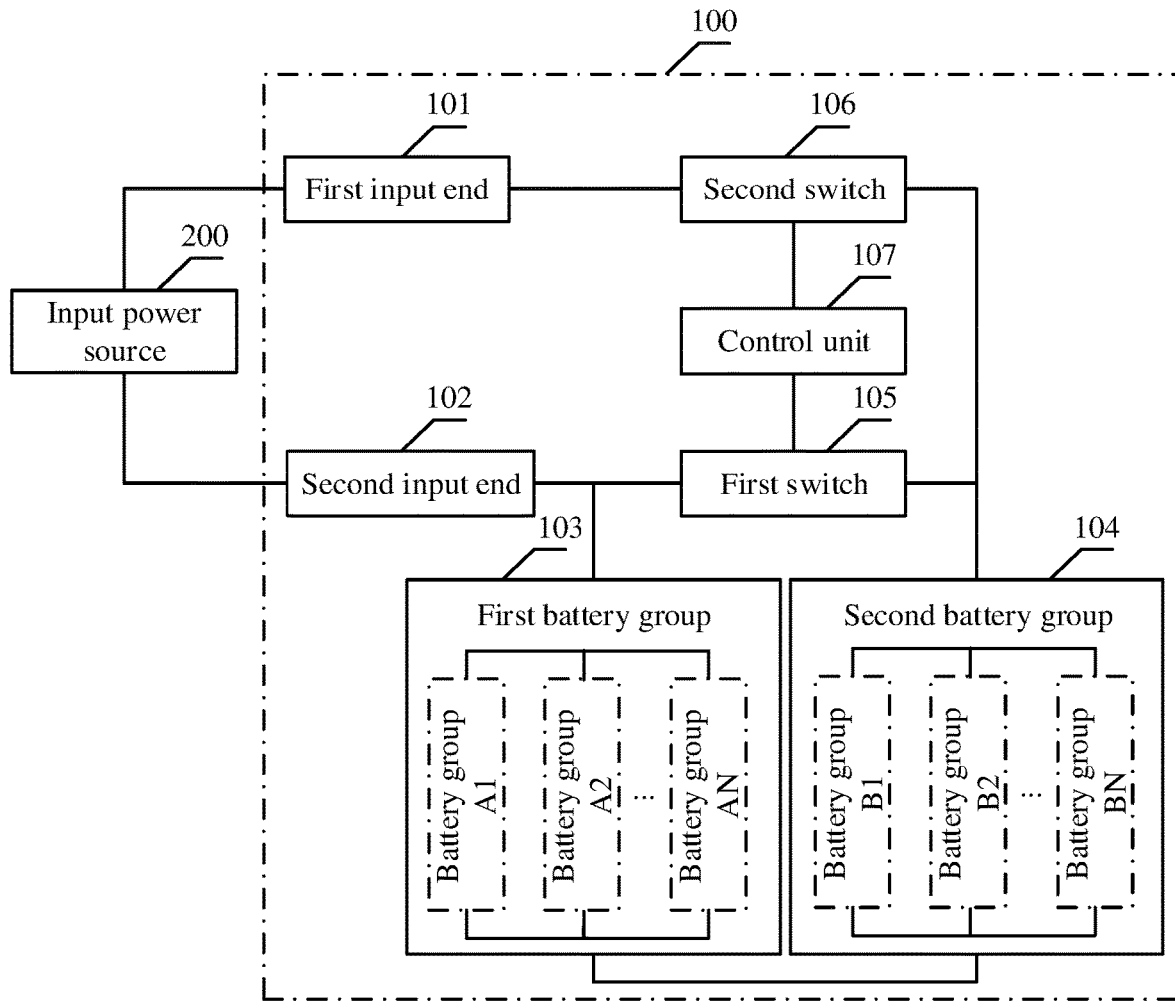
FIG. 5 is a schematic structural diagram of a heating system disclosed in yet another embodiment of this application.
FIG. 6 is a flowchart of a heating method disclosed in an embodiment of this application.

For example, in an embodiment, referring to FIG. 2 and FIG. 5, the first battery module 103 and the second battery module 104 each include N battery packs, and any one of the battery packs includes at least one battery cell, with N being a positive integer. The first battery module 103 includes battery pack A1, battery pack A2, . . . , and battery pack AN, and the second battery module 104 includes battery pack B1, battery pack B2, . . . , and battery pack BN.

Specifically, battery pack A1, battery pack A2, . . . , and battery pack AN are connected in parallel, and battery pack B1, battery pack B2, . . . , and battery pack BN are connected in parallel. In this case, a voltage between two ends of the first battery module 103 is a voltage between two ends of any one of battery pack A1, battery pack A2, . . . , and battery pack AN, and a voltage between two ends of the second battery module 104 is a voltage between two ends of any one of battery pack B1, battery pack B2, . . . , and battery pack BN. Therefore, the voltage of each battery pack is set to be the same or nearly the same, an overall voltage of the first battery module 103 and the second battery module 104 may be 0 or close to 0 during heating of the first battery module 103 and the second battery module 104, thereby lowering a requirement for the input power source and improving practicality.

For example, in another embodiment, the first battery module 103 and the second battery module 104 are two sets of battery cell modules of equal voltage within one battery pack, where each set of modules may include a plurality of modules connected in series or in parallel. For example, in still another embodiment, the first battery module 103 and the second battery module 104 may alternatively be two sets of battery cells of equal voltage, where each set of battery cells may include a plurality of battery cells connected in series or in parallel.

In an embodiment, still referring to FIG. 5, the control unit 107 is specifically configured to control the first switch 105 to be turned off, and control, by using a control signal with a duty cycle, the second switch 106 to be turned on or off, to heat the first battery module 103 and the second battery module 104 through the input power source 200.

An initial state of the first switch 105 is on and an initial state of the second switch 106 is off. The duty cycle is a preset duty cycle, the duty cycle may be determined by a root mean square value of a first current threshold, and the root mean square value of the first current threshold is a preset root mean square value of a current. In an implementation, the root mean square value of the first current threshold may correspond to a maximum root mean square value of a current that can be reached during heating of the first battery module 103 and the second battery module 104. Then, the corresponding duty cycle is obtained based on the root mean square value of the first current threshold and recorded as a maximum duty cycle. In this embodiment, setting the duty cycle to be less than the maximum duty cycle can reduce risks of the first battery module 103 and the second battery module 104 being damaged due to an over-large current, thereby protecting the first battery module 103 and the second battery module 104 and helping extend service life of the first battery module 103 and the second battery module 104.

In conclusion, the control signal with a duty cycle can be used to make the root mean square value of the output current of the input power source 200 (that is, the current flowing through the first battery module 103 and the second battery module 104) less than the root mean square value of the first current threshold, so as to protect the first battery module 103 and the second battery module 104.

It can be understood that in one embodiment, the root mean square value of the first current threshold can be a root mean square value of the current preset by users based on actual applications. For example, in actual application, the first current threshold can be determined in combination with a maximum root mean square value of a current that can flow through each electrical component in the heating system, so as to provide protection for each electrical component. In another embodiment, the control unit 107 may automatically set the root mean square value of the current based on a type or material of the battery, which is not limited in the embodiments of this application.

In an embodiment, after the first battery module 103 and the second battery module 104 are heated through the input power source 200, the control unit 107 is further configured to: if a temperature of the first battery module 103 and a temperature of the second battery module 104 are both greater than or equal to a first temperature threshold, control the second switch 106 to be turned off, and control the first switch 105 to be turned on after the second switch 106 remains off for a predetermined period of time.

The first temperature threshold may be a temperature value preset by a user or a temperature value automatically set by the control unit 107 based on a type or material of the battery, which is not limited in the embodiments of this application.

During heating of the first battery module 103 and the second battery module 104, the temperature of the first battery module 103 and the temperature of the second battery module 104 need to be detected in real time, to reduce a probability of damaging the first battery module 103 and the second battery module 104 due to excessively high temperature. Heating is completed when the temperature of the first battery module 103 and the temperature of the second battery module 104 reach the first temperature threshold. In this case, the second switch 106 is first controlled to be turned off to disconnect from the input power source 200.

Within the predetermined period of time in which the second switch 106 remains off, a voltage difference between the first battery module 103 and the second battery module 104 can be reduced to be less than a first voltage difference threshold. Then, the first switch 105 is controlled to be turned on after the second switch 106 remains off for the predetermined period of time. In this way, the heating of the first battery module 103 and the second battery module 104 is completed, and the first battery module 103 and the second battery module 104 can be used as a power source to provide a working voltage to the load. A predetermined period of time may be set based on a specific application scenario. This is not limited in the embodiments of this application. For example, in one embodiment, the predetermined period of time may be set to 10 minutes.

The first voltage difference threshold can be set based on the material or type of the battery, and/or the specific application scenario, which is not limited in the embodiments of this application. For example, in an embodiment, when a loop current between the first battery module 103 and the second battery module 104 affects the electrical components in the heating system, a voltage difference, corresponding to the loop current, between the first battery module 103 and the second battery module 104 is set to the first voltage difference threshold. In this embodiment, the voltage difference between the first battery module 103 and the second battery module 104 is reduced to be less than the first voltage difference threshold, so that a possible loop current has no or small effect on the electrical components, so as to protect the electrical components in the heating system and improve operation stability of the heating system.

Referring to FIG. 6, FIG. 6 is a flowchart of a heating method according to an embodiment of this application. For the structure of the heating system, reference may be made to the descriptions of FIG. 2 to FIG. 5, and details are not repeated herein. The heating method includes the following steps.

Step 61: If a heating request signal is received, control switch states of a first switch and a second switch to heat a first battery module and a second battery module.

The switch state includes on or off.

In an embodiment, the heating request signal may be a user-defined signal, that is, a heating request signal is sent by a user by using a button or the like. In another embodiment, the heating request signal may alternatively be a heating request signal that is actively output by a control unit when the control unit detects that the first battery module or the second battery module has a low temperature and needs to be heated. In addition, heating is performed only after a heating request signal is received, which can reduce a probability of accidental heating and help to protect the first battery module and the second battery module to extend service life of the first battery module and the second battery module. In an implementation, if the heating system is installed in an electric vehicle, after receiving the heating request signal, the heating system may first check current states of a first main switch, a second main switch, and an input power source, and after determining that the first main switch and the second main switch have been off and the heating system has been connected to the input power source, perform the heating process of the first battery module and the second battery module.

During heating of the first battery module and second battery module, the first battery module and the second battery module are reversely connected, and a voltage between two ends of the first battery module and a voltage between two ends of the second battery module cancel each other out. That is, an overall voltage of the first battery module and the second battery module is 0 or close to 0. In this case, the first battery module and the second battery module as a whole can be equated as a resistor. In this way, the first battery module and the second battery module can be heated through a low-voltage power source or a power grid, instead of using a particular power source as in the related art. This shows that the heating system has a lower requirement for the input power source. Therefore, the heating system can be applied to a variety of application scenarios, which is more practical. Implementation difficulty and costs are also reduced. Moreover, the first battery module and the second battery module can be heated at the same time, which also helps improve heating efficiency.

In an embodiment, as shown in FIG. 7, the controlling switch states of a first switch and a second switch to heat a first battery module and a second battery module in step 61 includes the following step.

Step 71: Control the first switch to be turned off, and control, by using a control signal with a duty cycle, the second switch to be turned on and off, to heat the first battery module and the second battery module.

An initial state of the first switch is on and an initial state of the second switch is off. The duty cycle is a preset duty cycle, the duty cycle may be determined by a root mean square value of a first current threshold, and the root mean square value of the first current threshold is a preset root mean square value of a current.

In an implementation, the root mean square value of the first current threshold may correspond to a maximum root mean square value of a current that can be reached during heating of the first battery module and the second battery module. The corresponding duty cycle can be obtained based on the root mean square value of the first current threshold and recorded as a maximum duty cycle. In actual application, setting the duty cycle to be less than the maximum duty cycle can reduce risks of the first battery module and the second battery module being damaged due to an overlarge current, thereby protecting the first battery module and the second battery module and helping extend service life of the first battery module and the second battery module.

In conclusion, in this embodiment, the control signal with the duty cycle can be used to make a root mean square value of an output current of the input power source (that is, a current flowing through the first battery module and the second battery module) less than the root mean square value of the first current threshold, so as to reduce the risks of the first battery module and the second battery module being damaged.

In an embodiment, as shown in FIG. 8, after heating the first battery module and the second battery module in step 61 or step 71, the heating method further includes the following step.

Step 81: If a temperature of the first battery module and a temperature of the second battery module are both greater than or equal to a first temperature threshold, control the second switch to be turned off, and control the first switch to be turned on after the second switch remains off for a predetermined period of time.

During heating of the first battery module and the second battery module, the temperature of the first battery module and the temperature of the second battery module need to be detected in real time, to reduce a probability of damaging the first battery module and the second battery module due to excessively high temperature. Heating is completed when the temperature of the first battery module and the temperature of the second battery module reach the first temperature threshold. In this case, the second switch is first controlled to be turned off to disconnect from the input power source and stop the heating.

Then, within the predetermined period of time in which the second switch remains off, a voltage difference between the first battery module and the second battery module can be reduced to be less than a first voltage difference threshold. The first switch is controlled to be turned on after the second switch remains off for the predetermined period of time. In this way, the heating of the first battery module and the second battery module is completed, and the first battery module and the second battery module can be used as a power source to provide a working voltage to a load.

In an embodiment, referring to FIG. 9, FIG. 9 shows temperature changes of the first battery module and the second battery module during the process of heating the first battery module and the second battery module by using the heating method provided in the application. The first battery module and the second battery module are composed of the same number of battery cells of the same type, so that a temperature change curve of the first battery module is the same as that of the second battery module. That is, in FIG. 9, curve L1 may be the temperature change curve of the first battery module or the temperature change curve of the second battery module. In FIG. 9, a horizontal coordinate represents time in minutes (min); and a vertical coordinate represents temperature in degrees Celsius (° C.).

The first battery module is used as an example for description. As shown in FIG. 9, an initial temperature of the first battery module is about 29° C. At the 0.5-th minute, the first switch is controlled to be turned off, and the second switch is controlled to be turned on or off by using a control signal with a duty cycle. The input power source outputs a current to the first battery module to heat the first battery module through its internal resistance, and the temperature of the first battery module begins to rise. In addition, because a temperature rise will cause the internal resistance of the first battery module to decrease, the temperature rise speed tends to be steady, that is, slope of curve L1 shows a gradually decreasing trend. At about the 12-th minute, the temperature of the first battery module is greater than or equal to a first temperature threshold, the second switch is controlled to be turned off to disconnect from the input power source and stop heating the first battery module, and the temperature of the first battery module decreases again.

In this embodiment, the process of heating the first battery module and the second battery module can be implemented by using the heating method provided in the embodiment of this application. In addition, the input power source can be a low-voltage power source or an alternating current power source, such as a power grid, and can be used in a variety of application scenarios, which is more practical.

In an embodiment, the heating system is used in an electric vehicle, and the first battery module, the second battery module, and the first switch form a battery pack. The battery pack further includes a battery management system (BMS), and the electric vehicle further includes a vehicle control unit (VCU), meaning that the control unit in the foregoing embodiments includes the BMS and the VCU.

In this implementation, the BMS can collect status information of the battery pack, such as battery temperature, state of charge (SOC), voltage signal, and current signal, and determine, based on the status information, whether the battery pack needs to be heated. When it is determined that the battery pack needs to be heated, the BMS can send a heating request signal to the VCU. The VCU determines, based on the heating request signal sent by the BMS, whether to start the heating system to heat the battery pack.

If the VCU determines to start the heating system to heat the battery pack, the BMS controls the first switch to be turned off, and the VCU controls the second switch to be turned on and off at a preset duty cycle to heat the battery pack.

During heating of the battery pack, if the temperature of the first battery module and the temperature of the second battery module in the battery pack already meet a requirement, the VCU can control the second switch to be turned off, and send a stop-heating signal to the BMS so that the BMS controls the first switch to be turned on. In other words, the VCU controls the heating system to stop heating the battery pack.

In addition, the BMS of the battery pack can also monitor temperature of the battery pack during heating of the battery pack. When the temperature of the battery pack 12 is abnormal, the BMS can send temperature abnormality information to the VCU, and the VCU controls the heating system to stop the heating process of the battery pack.

Figure 10:
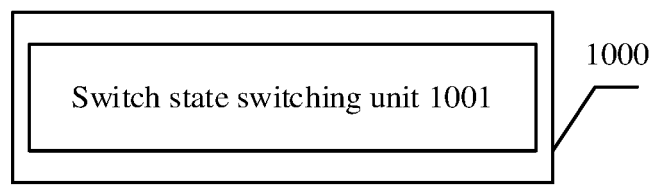
FIG. 10 is a schematic structural diagram of a heating apparatus disclosed in an embodiment of this application.

FIG. 10 is a schematic structural diagram of a heating apparatus according to an embodiment of this application. The heating apparatus 1000 is applied to a heating system. For the structure of the heating system, reference may be made to the descriptions of FIG. 2 to FIG. 5, and details are not repeated herein. The heating apparatus 1000 includes an switch state switching unit 1001.

The switch state switching unit 1001 is configured to: if a heating request signal is received, control switch states of a first switch and a second switch to heat a first battery module and a second battery module, where the switch state includes on or off.

The foregoing product can execute the method provided in the embodiment of this application shown in FIG. 6, has corresponding functional modules for executing the method, and achieves the same beneficial effects. For technical details not exhaustively described in this embodiment, reference may be made to the method provided in the embodiments of this application.

Figure 11:
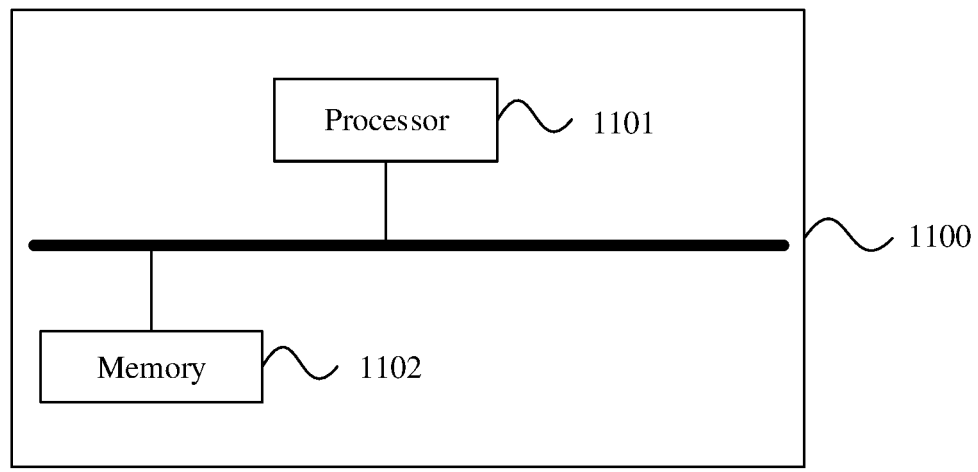
FIG. 11 is a schematic structural diagram of a battery management system disclosed in another embodiment of this application.

FIG. 11 is a schematic structural diagram of a battery management system according to an embodiment of this application. As shown in FIG. 11, the battery management system 1100 includes one or more processors 1101 and a memory 1102. One processor 1101 is used as an example in FIG. 11.

The processor 1101 and the memory 1102 can be connected by using a bus or in other manners, and a bus connection is used as an example in FIG. 11.

The memory 1102 as a non-volatile computer-readable storage medium can be used to store non-volatile software programs, non-volatile computer-executable programs, and modules, such as the program instructions/modules corresponding to the heating method in the embodiments of this application (such as the unit described in FIG. 10). By running the non-volatile software programs, instructions, and modules stored in the memory 1102, the processor 1101 executes various functional applications and data processing in the heating apparatus, that is, implements the heating method in the foregoing method embodiments and functions of the units in the foregoing apparatus embodiment.

The memory 1102 may include a high-speed random access memory, and may also include a non-volatile memory, for example, at least one disk storage device, a flash memory device, or other non-volatile solid-state storage devices. In some embodiments, the memory 1102 may optionally include a memory that is remotely located relative to the processor 1101, and the remote memory may be connected to the processor 1101 via a network. Examples of the network include but are not limited to the Internet, corporate intranet, local area network, mobile communication network, and a combination thereof.

The program instructions/modules are stored in the memory 1102. When the program instructions/modules are executed by the one or more processors 1101, the heating method in any one of the method embodiments are performed, for example, steps shown in FIG. 6, FIG. 7 and FIG. 8 are performed, or functions of the units in FIG. 10 may also be implemented.

An embodiment of this application further provides an electric device, including the heating system according to any one of the foregoing embodiments.

In an embodiment, the electric device is an electric vehicle.

An embodiment of this application further provides a non-volatile computer storage medium, where the non-volatile computer storage medium stores computer-executable instructions, and when the computer-executable instructions are executed by one or more processors, the one or more processors may perform the heating method according to any one of the foregoing method embodiments. For example, steps shown in FIG. 6, FIG. 7, and FIG. 8 are performed, and functions of the units in the FIG. 10 may also be implemented.

The foregoing apparatus or device embodiments are merely examples. Module units described as separate components may or may not be physically separate. Parts shown as modules or units may be or may not be physical units, and may be located in one place, or may be distributed in a plurality of network modules or units. Some or all of the modules may be selected based on an actual requirement, to achieve the objectives of the solutions in the embodiments.

Based on the foregoing descriptions of the implementations, a person skilled in the art may clearly understand that each implementation can be implemented by using software in combination to a universal hardware platform, or by using hardware only. Based on such an understanding, the technical solutions substantially or parts making contributions to the related art or part of the technical solutions may be embodied in form of a software product, and the software product may be stored in a computer-readable storage medium, such as a ROM/RAM, a magnetic disk, or an optical disc, and includes several instructions for instructing a computer device (which may be a personal computer, a server, a network device, or the like) to perform the methods described in the embodiments or some parts of the embodiments.

Although this application has been described with reference to some embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

The invention claimed is:

1. A heating system, comprising:
a first input end and a second input end, wherein the first input end and the second input end are configured to connect to two terminals of an external input power source, respectively;
a first battery module, a second battery module, a first switch, and a second switch, wherein:
a first terminal of the first switch is connected to a first terminal of the first battery module, and a second terminal of the first switch is connected to a first terminal of the second battery module, the first terminal of the first battery module and the first terminal of the second battery module having a same polarity, the first switch being configured to control a connection between the first terminal of the battery module and the first terminal of the second battery module;
a second terminal of the first battery module is connected to a second terminal of the second battery module, the second terminal of the first battery module and the second terminal of the second battery module having a same polarity, the polarity of the first terminal of the first battery being opposite to the polarity of the second terminal of the first battery;
a first terminal of the second switch is connected to between the first input end, and a second terminal of the second switch is connected to the first terminal of the second battery module, the second switch being configured to control a connection between the first input end and the first terminal of the second battery module; and
the second input end is connected to the first terminal of the first battery module;
and
a control unit, wherein the control unit is connected to the first switch and the second switch, and the control unit is configured to control the first switch and the second switch to be turned on or off, to heat the first battery module and the second battery module through the input power source.

2. The heating system according to claim 1, wherein the first terminal of the second battery module is connected to a first terminal of a load through a first main switch, and the second terminal of the second battery module is connected to a second terminal of the load through a second main switch; and
the first main switch is the second switch.

3. The heating system according to claim 1, wherein:
a voltage between the first terminal and the second terminal of the first battery module is equal to a voltage between the first terminal and the second terminal of the second battery module.

4. The heating system according to claim 3, wherein:
the first battery module and the second battery module each comprise N battery packs, wherein N is a positive integer; and
the N battery packs of the first battery module are connected in parallel, and the N battery packs of the second battery module are connected in parallel.

5. The heating system according to claim 1, wherein:
the control unit is further configured to control the first switch to be turned off, and control, by using a control signal with a duty cycle, the second switch to be turned on or off, to heat the first battery module and the second battery module through the input power source; and
the control signal with the duty cycle is configured to cause a root mean square value of an output current of the input power source to be less than a root mean square value of a current threshold.

6. The heating system according to claim 1, wherein the control unit is further configured to, after the first battery module and the second battery module are heated through the input power source:
in response to a temperature of the first battery module and a temperature of the second battery module being both greater than or equal to a temperature threshold, control the second switch to be turned off, and control the first switch to be turned on after the second switch remains off for a predetermined period of time.

7. A heating method, applied to the heating system according to claim 1, the method comprising:
in response to receiving a heating request signal, controlling switch states of the first switch and the second switch to heat the first battery module and the second battery module, wherein the switch state comprises on or off.

8. The heating method according to claim 7, wherein:
controlling the switch states of the first switch and the second switch to heat the first battery module and the second battery module comprises:
controlling the first switch to be turned off, and controlling, by using a control signal with a duty cycle, the second switch to be turned on or off, to heat the first battery module and the second battery module; and
the control signal with the duty cycle is configured to cause a root mean square value of an output current of the input power source to be less than a root mean square value of a current threshold.

9. The method according to claim 7, further comprising, after heating the first battery module and the second battery module:
in response to a temperature of the first battery module and a temperature of the second battery module being both greater than or equal to a temperature threshold, controlling the second switch to be turned off, and controlling the first switch to be turned on after the second switch remains off for a predetermined period of time.

10. An electric device, comprising a heating system comprising:
a first input end and a second input end, wherein the first input end and the second input end are configured to connect to two terminals of an external input power source, respectively;
a first battery module, a second battery module, a first switch, and a second switch, wherein:
a first terminal of the first switch is connected to a first terminal of the first battery module, and a second terminal of the first switch is connected to a first terminal of the second battery module, the first terminal of the first battery module and the first terminal of the second battery module having a same polarity, the first switch being configured to control a connection between the first terminal of the battery module and the first terminal of the second battery module;
a second terminal of the first battery module is connected to a second terminal of the second battery module, the second terminal of the first battery module and the second terminal of the second battery module having a same polarity, the polarity of the first terminal of the first battery being opposite to the polarity of the second terminal of the first battery;
a first terminal of the second switch is connected to between the first input end, and a second terminal of the second switch is connected to the first terminal of the second battery module, the second switch being configured to control a connection between the first input end and the first terminal of the second battery module; and
the second input end is connected to the first terminal of the first battery module;
and
a control unit, wherein the control unit is connected to the first switch and the second switch, and the control unit is configured to control the first switch and the second switch to be turned on or off, to heat the first battery module and the second battery module through the input power source.

11. The electric device according to claim 10, wherein the first terminal of the second battery module is connected to a first terminal of a load through a first main switch, and the second terminal of the second battery module is connected to a second terminal of the load through a second main switch, and
the first main switch is the second switch.

12. The electric device according to claim 10, wherein:
a voltage between the first terminal and the second terminal of the first battery module is equal to a voltage between the first terminal and the second terminal of the second battery module.

13. The electric device according to claim 12, wherein:
the first battery module and the second battery module each comprise N battery packs, wherein N is a positive integer; and
the N battery packs of the first battery module are connected in parallel, and the N battery packs of the second battery module are connected in parallel.

14. The electric device according to claim 10, wherein:
the control unit is further configured to control the first switch to be turned off, and control, by using a control signal with a duty cycle, the second switch to be turned on or off, to heat the first battery module and the second battery module through the input power source; and
the control signal with the duty cycle is configured to cause a root mean square value of an output current of the input power source to be less than a root mean square value of a current threshold.

15. The electric device according to claim 10, wherein the control unit is further configured to, after the first battery module and the second battery module are heated through the input power source:
in response to a temperature of the first battery module and a temperature of the second battery module being both greater than or equal to a temperature threshold, control the second switch to be turned off, and control the first switch to be turned on after the second switch remains off for a predetermined period of time.

* * * * *